(12) United States Patent
Lee et al.

(10) Patent No.: US 6,545,624 B2
(45) Date of Patent: Apr. 8, 2003

(54) IMAGE SENSOR WITH ANALOG-TO-DIGITAL CONVERTER THAT GENERATES A VARIABLE SLOPE RAMP SIGNAL

(75) Inventors: Kang-Jin Lee, Ichon-shi (KR); Chan-Ki Kim, Ichon-shi (KR); Jae-Won Eom, Ichon-shi (KR); Woodward Yang, Cambridge, MA (US)

(73) Assignee: Hyundai Electronics Industries Co., Ltd., Kyongki-do ( * ) Notice: Subject to any disclaimer, the term of this patent is extended or adjusted under 35 U.S.C. 154(b) by 0 days.

(21) Appl. No.: 09/780,944

(22) Filed: Feb. 8, 2001

(65) Prior Publication Data

US 2002/0067303 A1 Jun. 6, 2002

Related U.S. Application Data

(60) Provisional application No. 60/182,041, filed on Feb. 11, 2000.

(51) Int. Cl.[7] .................................................. H03M 1/12
(52) U.S. Cl. ........................ 341/155; 341/161; 341/169; 341/170
(58) Field of Search ................................ 341/161, 162, 341/163, 169, 170, 155

(56) References Cited

U.S. PATENT DOCUMENTS 4,843,395 A * 6/1989 Morse ......................... 341/118
6,137,432 A * 10/2000 Xiao ........................... 341/155
6,271,785 B1 * 8/2001 Martin et al. ................ 341/155

OTHER PUBLICATIONS

Daniel J. Friedman et al., "An interline CCD imaging array with on-chip A/D conversion", Proceedings SPIE—The International Society for Optical Engineering, Feb. 7–8, 1994.

Woodward Yang et al., "WA 17.3: An Integrated 800×600 CMOS Imaging System", 1999 IEEE International Solid-State Circuits Conference, 1999 Digest of Technical Papers, Feb. 15–17, 1999.

Woodward Yang et al., "WA 17.3: An Integrated 800×600 CMOS Imaging System", 1999 IEEE International Solid-State Circuits Conference, Slide Supplement 1999 to the Digest of Technical Papers, Feb. 15–17, 1999.

* cited by examiner

Primary Examiner—Michael Tokar
Assistant Examiner—Lam T. Mai
(74) Attorney, Agent, or Firm—Townsend and Townsend and Crew LLP

(57) ABSTRACT

A programmable analog-to-digital converter (ADC) for use in a CMOS imaging system, the CMOS imaging system having an array of pixels, and the ADC configured to provide a enhanced conversion resolution for pixels providing a low analog voltage level and a relatively coarser conversion resolution for pixels providing a relatively higher analog voltage level.

23 Claims, 8 Drawing Sheets

IMAGE SENSOR WITH ANALOG-TO-DIGITAL CONVERTER THAT GENERATES A VARIABLE SLOPE RAMP SIGNAL

CROSS-REFERENCE TO RELATED APPLICATIONS

This non-provisional patent application claims priority from provisional U.S. Patent Application No. 60/182,041, filed Feb. 11, 2000, which is incorporated by reference into this application for all purposes.

BACKGROUND OF THE INVENTION

This present invention relates generally to image processing and, more particularly, to a CMOS image sensor using a programmable analog-to-digital converter (ADC).

As developments in CMOS image sensor technology continue, CMOS imagers are increasingly displacing charge-coupled devices (CCDs) as the image sensor of choice. There are a variety of reasons for this shift in imager preference. First, CCD imagers require specialized facilities, which are dedicated exclusively to CCDs. Second CCD imagers consume a substantial amount of power, since they are essentially capacitive devices, which require external control signals and large clock swings to achieve acceptable charge transfer efficiencies. Third, CCD imagers require various support chips to operate the device, condition the image signal, perform. post processing and generate standard video output. This additional support circuity makes CCD systems complex, and requires numerous power supplies, clock drivers and voltage regulators, which consume significant amounts of power.

By contrast, CMOS imagers have a less complex design, compared to CCD imagers, which leads to a reduction in engineering and production costs. Because of the simple architecture, CMOS imagers consume substantially less power than CCD imagers. The less complex design, CMOS imagers have a higher level of integration capability, and an entire CMOS-based imaging system, for example a digital camera, can even be built on a single semiconductor chip. Also, unlike CCD imagers, CMOS imagers are amenable to being manufactured in standard CMOS fabrication facilities. The ability to utilize standard CMOS fabrication facilities can significantly reduces plant overhead costs.

A CMOS imaging system includes, among other things, a bank of analog-to-digital converters (ADC), which operate to convert analog signals, provided by pixels within a pixel array, into a digital format. One way of accomplishing this is to use what is known as a single slope ADC.

An inherent characteristic of the single slope ADC is that it treats all light levels the same, i.e., it coverts all analog light levels at the same resolution. This unvarying characteristic can be problematic, particularly at very low or very high illumination levels. For instance, at low light levels, a pixel output is limited by pixel noise, which can only be overcome by providing higher resolution processing. And, for high light levels, although a pixel output is affected by illumination shot noise, enhanced resolution is not only unnecessary, it is also unwanted, since enhanced resolution under such conditions reduces the dynamic range of the imager.

In light of the foregoing, what is needed is an imaging system having an ADC that provides variable resolution under varying illumination conditions.

SUMMARY OF THE INVENTION

The present invention provides methods and apparatus implementing an improved CMOS imaging system. In one aspect of the invention, a programmable analog-to-digital converter (ADC) is provided for a CMOS imaging system having an array of pixels, the ADC is configured to provide a first conversion resolution for pixels providing a first analog voltage level and a second conversion resolution for pixels providing a second analog voltage level.

In another aspect of the invention, an ADC is provided for converting an analog pixel voltage to a digital representation thereof. This particular embodiment includes: a programmable ramp voltage generator configured to produce a multi-slope ramp voltage signal; a digital counter coupled to an input of the ramp voltage generator and configured to provide the digital representation; a comparator having a first input coupled to an output of the ramp voltage generator and a second input coupled to the analog pixel voltage; and a switch configured to selectively couple the digital representation to a digital storage upon a change in a voltage at the output of the comparator.

In another embodiment of the invention, a CMOS imaging system is provided, the system including: a pixel array; a row decoder coupled to the pixel array and configured to select a row of pixels within the pixel array; and a programmable multi-slope ADC coupled to the pixel array.

In yet another aspect of the present invention, a method is provided for converting an analog pixel signal to a digital representation thereof. In this exemplary method, steps are provided for varying the resolution of the conversion, depending on the illumination level of the analog pixel value, and during a single conversion cycle.

A better understanding of the nature and advantages of the present invention may be gained with reference to the detailed description below, the drawings and the appended claims.

DESCRIPTION OF THE SPECIFIC EMBODIMENTS

Figure 1:
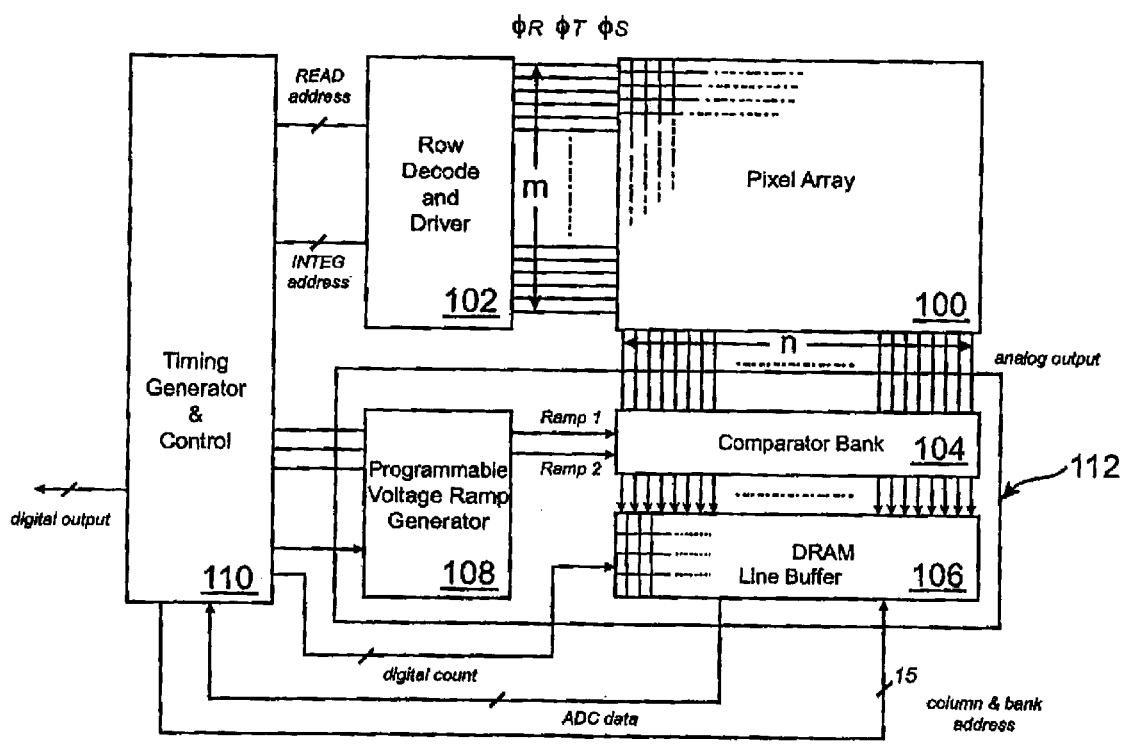
FIG. 1 is an exemplary block diagram of an embodiment of a digital CMOS imaging array, comparators and DRAM line buffer, according to an embodiment of the present invention.

Referring to FIG. 1, there is shown a block diagram of an exemplary CMOS image sensor system 10 according to the present invention. The system 10 is comprised of a pixel array 100; an m-wide bank of row decoders and drivers 102 that connect to rows of pixels in pixel array 100; an n-wide parallel bank of comparators 104 that receive pixel data from pixel array 100; a line buffer 106 that stores digital pixel values, typically implemented by dynamic random access memory (DRAM); a programmable voltage ramp generator 108 for providing a ramp voltage to comparator bank 104; and a timing generator and control 110. The circuitry and layout for an exemplary unit pixel 10 of pixel array 100 of FIG. 1 is described in detail in commonly assigned U.S. Application No. 60/182,044 which is hereby incorporated by reference.

In the specific embodiment of FIG. 1, analog voltage ramp generator 108 is used to drive comparator bank 104. Line buffer 106 is configured as a double-buffered line memory so that digital double sampling (DDS) sensor readout and analog-to-digital conversion can be performed concurrently. Use of DDS in the context of the present invention will be described later. Together, parallel comparator bank 104, analog voltage ramp generator 108 and line buffer 106 comprise an analog-to-digital converter (ADC) 112. The parallel configuration of comparators permits analog-to-digital conversion, on a selected group of pixel values simultaneously.

Timing generator and control 110 provides READ and INTEG addresses to row decoder, column and bank address and digital count to DRAM line buffer 106, and analog biases for voltage ramp generator 108. It also accepts digitally converted data from line buffer 106. Row decoder and driver bank 102 provide an integration address signal to select a pixel row and initiate integration of collected photocharge and also provide a read address for reading out the pixel value at the end of the integration period.

Figure 2:
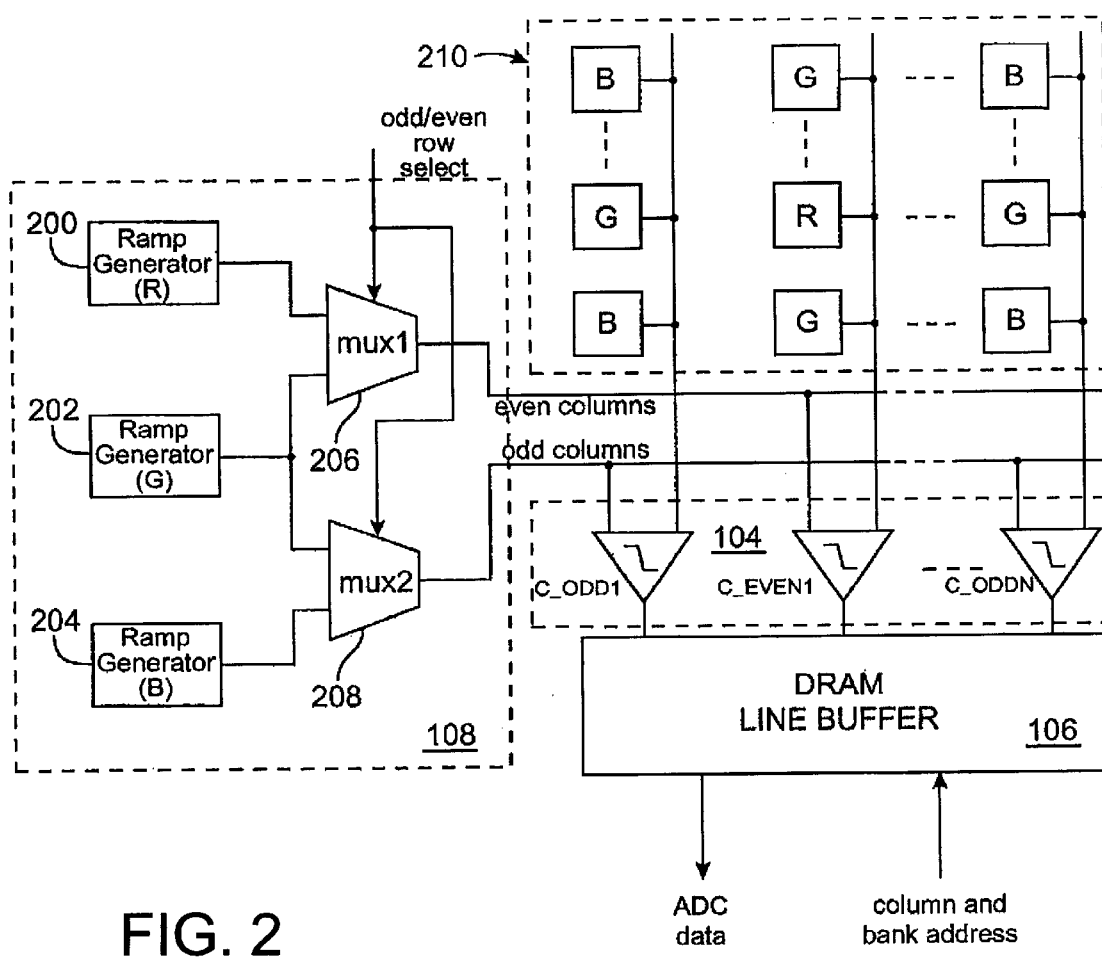
FIG. 2 is a schematic diagram of ramp generators, multiplexers, pixel array, comparators and line buffer, according to an embodiment of the present invention and configured to convert an analog pixel value to a digital representation thereof.

An exemplary embodiment of a portion of the CMOS image sensor system 10 of FIG. 1 is shown in FIG. 2. Referring to FIG. 1, this embodiment includes: pixel array 100; comparator bank 104; line buffer 106 and programmable voltage ramp generator 108. Referring now to FIG. 2, programmable voltage ramp generator 108 includes three programmable ramp generators 200, 202, 204, corresponding to the three primary colors red, green and blue, respectively and multiplexers 206 and 208. Multiplexers 206 and 208 multiplex the outputs of programmable ramp generators 200, 202, 204 into either odd column comparators C_ODD1–C_ODDN or even column comparators C_EVEN1–C_EVENN, of comparator bank 104. This circuit provides white balance compensation for red, green and blue pixels preferably arranged in a Bayer pattern array 210. Converted pixel data is stored in line buffer 106. Operation of the CMOS image sensor system 10 of FIG. 1, including analog-to-digital conversion, will be described next in connection with FIG. 3.

Figure 3:
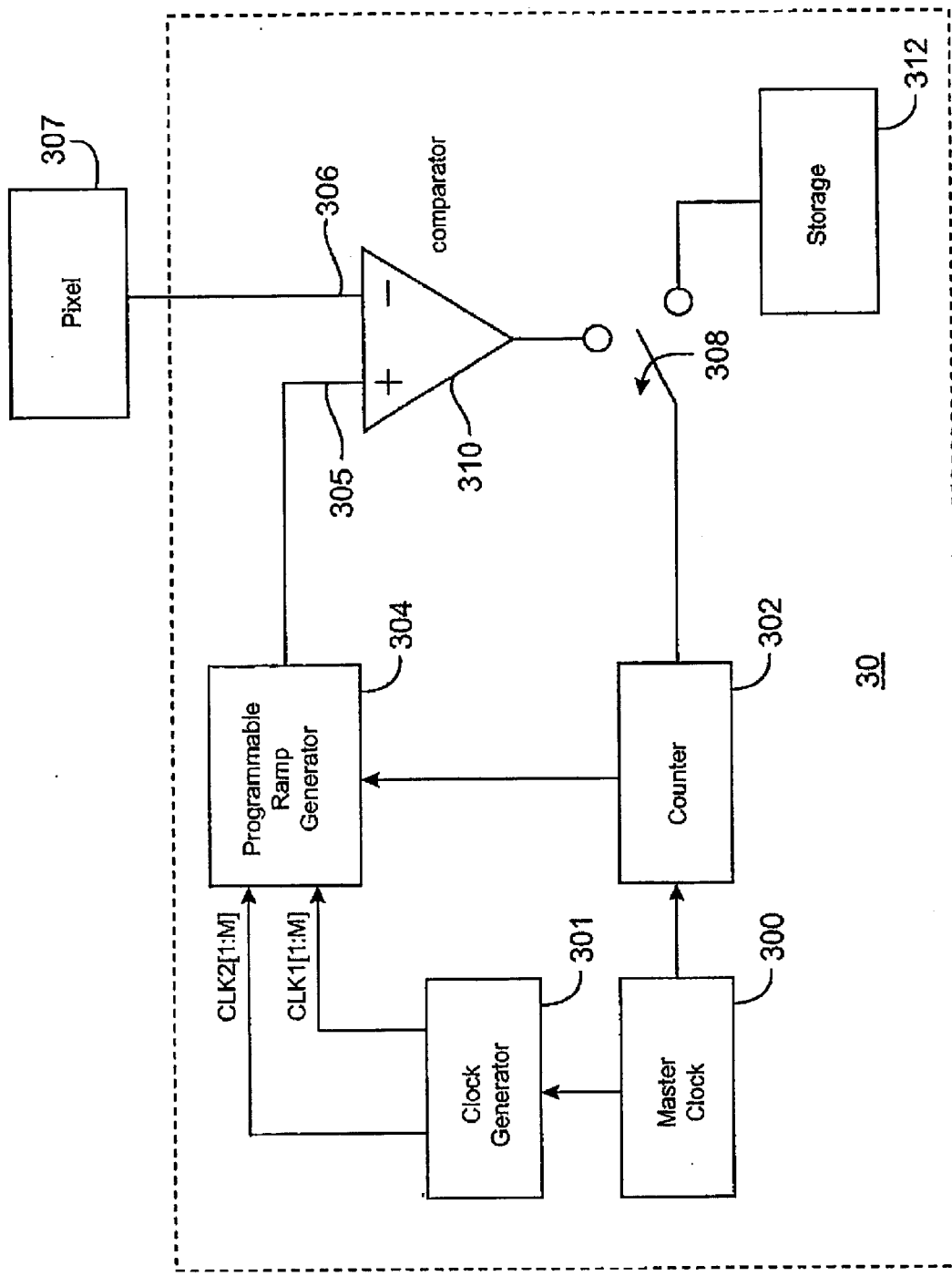
FIG. 3 is a block diagram of an exemplary embodiment of a programmable multiple slope ADC according to the present invention.

Referring now to FIG. 3, there is shown a block diagram of an exemplary embodiment of a programmable multiple slope ADC 30 for a single pixel implemented in accordance with the present invention. ADC 30 is comprised of master clock 300, clock generator 301, digital counter 302, programmable ramp generator 304, analog pixel input 306, switch 308, comparator 310 and digital storage 312. In this embodiment, master clock 300 drives counter 302 and clock generator 301. Clock generator 301 produces CLK1 and CLK2, which are non-overlapping signals used to drive programmable ramp generator 304. The output of programmable ramp generator 304 is coupled to the non-inverting input 305 of comparator 310 and the output of unit pixel 307 is coupled to the inverting input of comparator 310. The output of counter 302 is selectively coupled to digital storage 312, via switch 308, which is controlled by the output of comparator 310.

In operation, the exemplary embodiment of the ADC of FIG. 3 operates as follows. Programmable ramp generator 304 provides a ramped voltage that starts from a reset value and progressively decreases during the time the analog pixel value is being sensed. Master clock 300 controls the counting of counter 302 as well as the generation of the ramp voltage produced by programmable ramp generator 304. The timing of programmable ramp generator 304 is synchronous to the timing of digital counter 302 since digital counter 302 is controlled by master clock 300, and CLK1 and CLK2, which drive ramp generator 304, synchronously derive from the master clock 300.

While the output of programmable ramp generator 304 ramps down to a lower value, digital counter 302 counts and this digital code is overwritten on the coupled digital storage 312. When the ramped voltage falls below the analog pixel voltage, the output of comparator 310 changes state, thereby causing switch 308 to switch and decouple digital storage 312 from digital counter 302. The number of counts counted by digital counter 302 is thereby stored in digital storage 312 as a digital representation of the analog pixel voltage. In this exemplary embodiment, digital counter 302 is a gray code counter. However, other types of digital counters can be used, so long as they are capable of defining a set of analog pixel values characterized by a predetermined resolution and dynamic range.

Figure 4A:
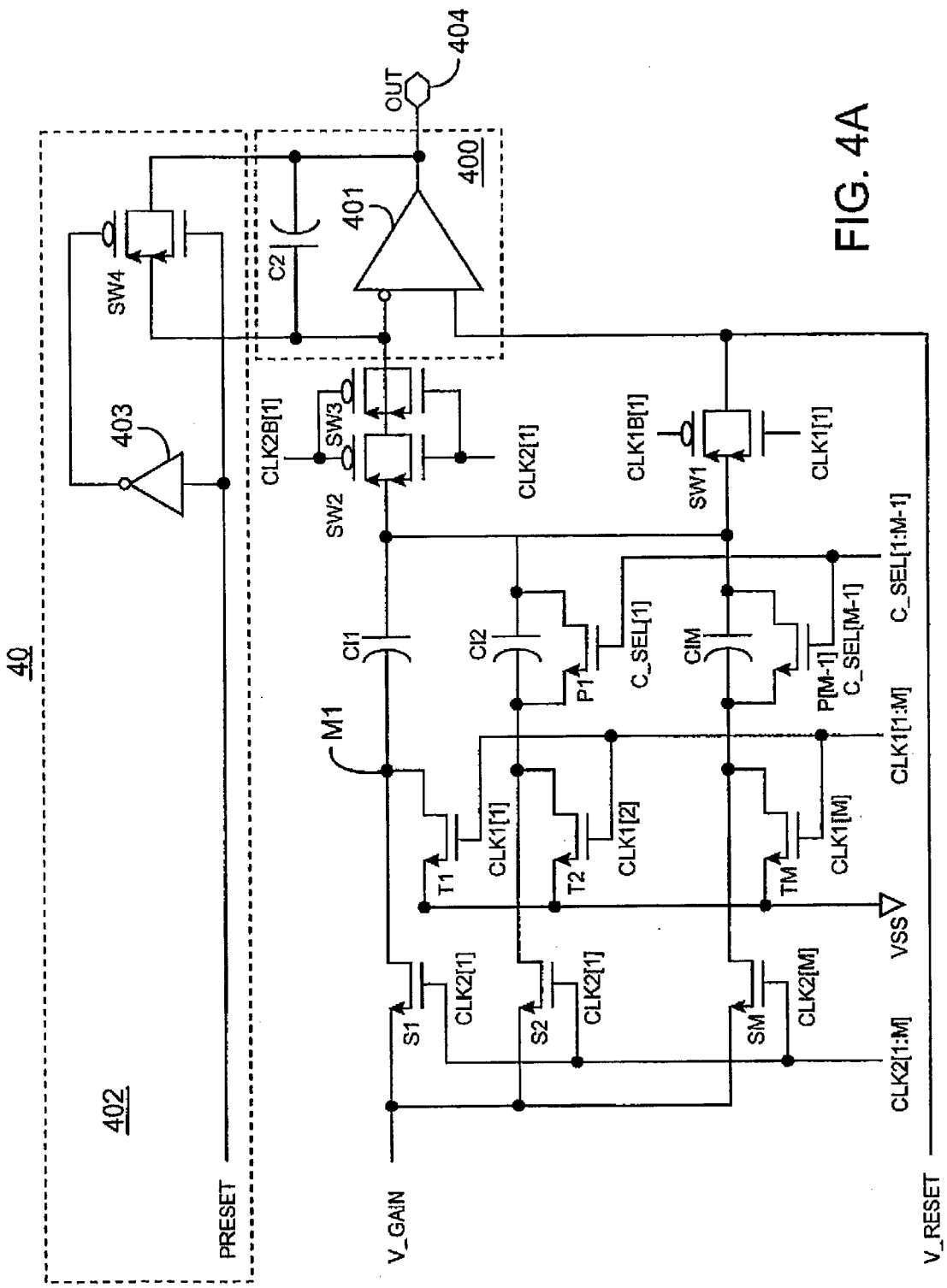
FIG. 4A is an exemplary embodiment of a programmable ramp generator circuit according to the present invention.

An exemplary schematic diagram of the programmable ramp generator 40 of FIG. 3 is shown in FIG. 4A. Ramp generator 40 includes (i) switches S1 through SM, selectively coupling input charge increment, V_GAIN, to firsts terminals of dump capacitors CI1 through CIM, respectively; (ii) switches T1 through TM, selectively coupling the first terminals of dump capacitors CI1 through CIM to ground, respectively; (iii) dump capacitor select switches P1 through P[M−1], each selectively coupled across dump capacitors CI2 through CIM, respectively; (iv) transmission switches SW1 through SW4; (v) integrator 400, which includes an amplifier 401 and feedback capacitor C2; and (vi) preset circuit 402.

Figure 4B:
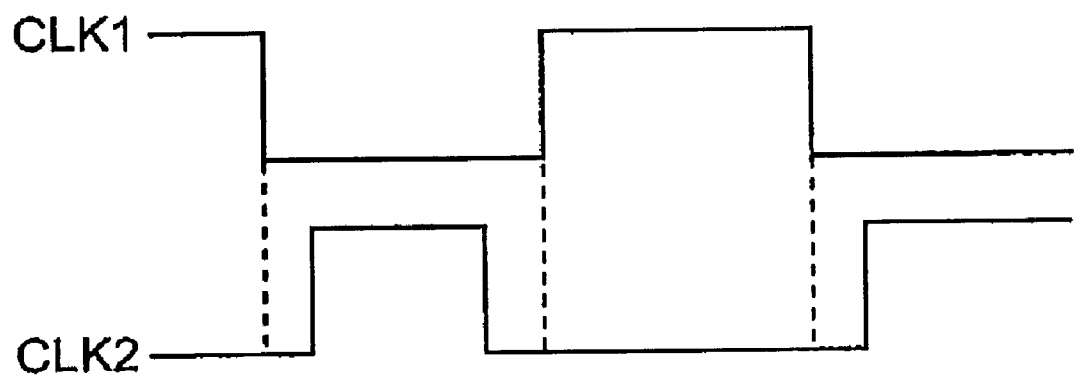
FIG. 4B is a timing diagram illustrating the timing relationship between CLK1 and CLK2 signals used to control operation of the ramp generator circuit of FIG. 4A.

The operation of ramp generator 40 will be described in connection with the timing diagram of FIG. 4B. Referring now to FIG. 4B, there is shown the CLK1 and CLK2 clock signals for driving the ramp generator 40 of FIG. 4A. CLK1 and CLK 2 derive from the ADC master clock (e.g., master clock 300, in the embodiment of FIG. 3). Both CLK1 and CLK2 have the same frequency, may have the same or different duty cycles, and overlap in phase. In response to clock signals CLK1 and CLK2, switches S1 through SM, T1 through TM and SW1 through SW4 cause charge to be pumped to selected dump capacitors, CI1 through CIM, the charge of which is then transferred to integrator 400 to provide the requisite ramp voltage at the output 404 of programmable ramp generator 40.

The slope of the ramp voltage appearing on output 404 of ramp generator 40 in FIG. 4A is programmable and can be controlled in a variety of ways. Factors that can vary the slope of the ramp generator output 404 include the input charge increment, V_GAIN, the magnitude of the total dump capacitance (e.g. CI1+CI2+ . . . ) and the frequencies of clocks CLK1 and CLK2. These factors can be programmed so that different ramp voltage slopes can be tailored for a specific application. For example, as shown in FIG. 4A, the magnitude of the total dump capacitance can be programmed by applying digital control signals, C_SEL [1:M−1], to the gates of select transistors P1 through P[M−1]. If the voltage at the gate of a particular select transistor is low, the select transistor remains off and the dump capacitor associated with that select transistor adds to the total dump capacitance. On the other hand, if the voltage at the gate of a particular select transistor is high, the select transistor turns on to effectively short out the dump capacitor associated with that select transistor so that it does not add to the total dump capacitance.

Figure 4C:
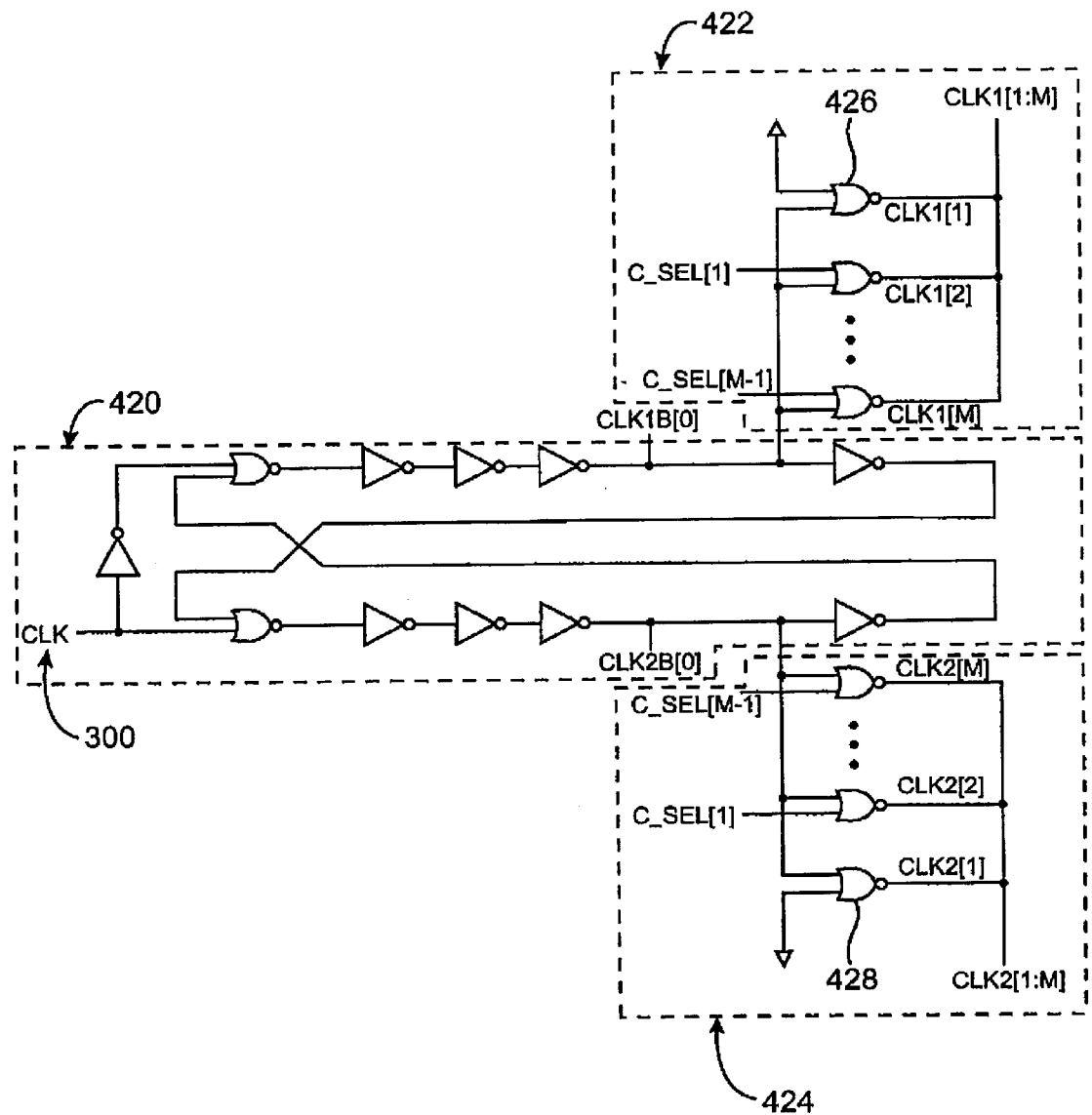
FIG. 4C is an exemplary embodiment of a clock generating circuit for producing clock signals CLK1 and CLK2, which are used to control operation of the ramp generator circuit of FIG. 4A.

Referring to FIG. 4C, there is shown an exemplary embodiment of a clock generator, which can be used for the clock generator 301 in the implementation of FIG. 3. Flip-flop 420 is driven by master clock 300 to generate CLK1B and CLK2B. CLK1B and CLK2B are coupled to select blocks 422 and 424, which include the dump capacitor select inputs C_SEL[1] through C_SEL[M−1] of FIG. 4A. So long as a particular dump capacitor select input, say, for example, C_SEL[1] is asserted high, the outputs of the NOR gates (in this example, NOR gates 426 and 428), which are CLK1[2] and CLK2[2], remain low and no clocking occurs at switches S2 and T2.

Figure 4D:
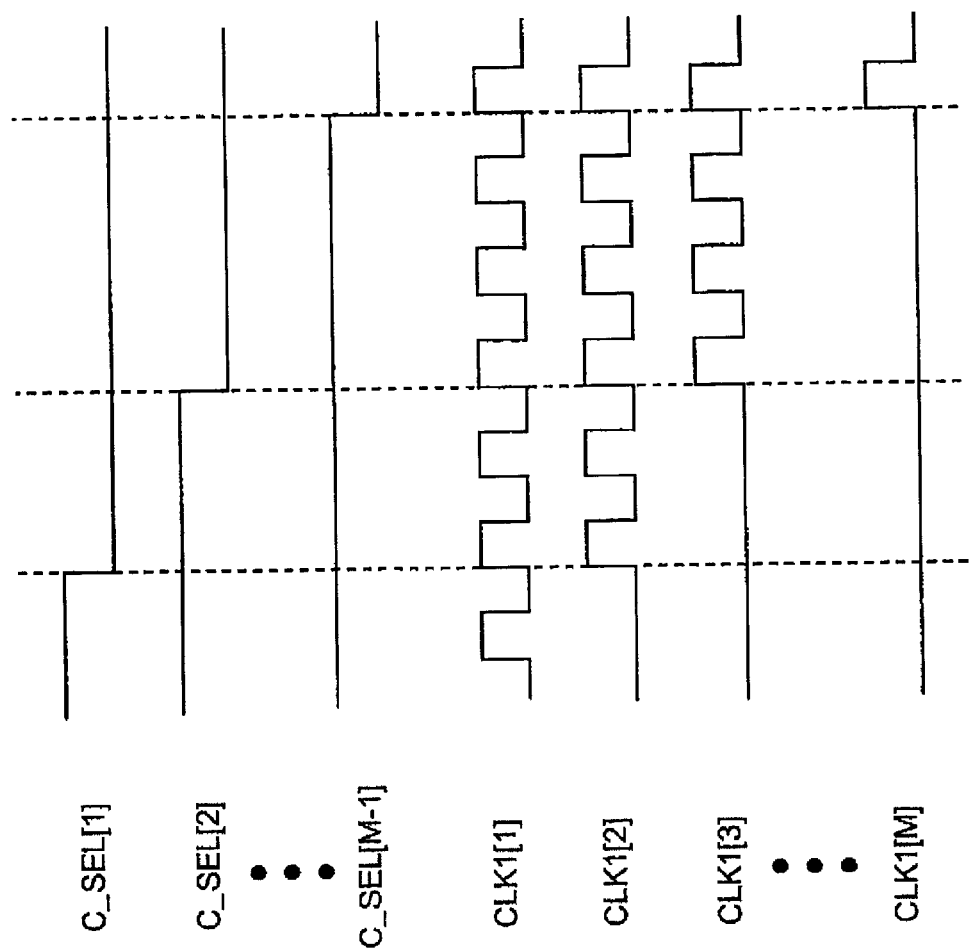
FIG. 4D is a timing diagram showing the relationship between C_SEL[1] through C_SEL[M−1] and CLK[1] through CLK[M]

As described in the previous paragraph, when any of dump capacitor select inputs C_SEL[1] through C_SEL [M−1] are asserted high, the dump capacitors CI2 through CIM, which are associated with the asserted low condition at inputs C_SEL[1] through C_SEL[M−1], are shorted out. Under these conditions, there is no need to provide clocks CLK1 or CLK2 to the associated switches S2 through SM. Indeed, decoupling the clocks is beneficial since it reduces noise, thereby reducing the probability of unwanted conversion errors. A timing diagram showing the relationship between C_SEL[1] through C_SEL[M−1] and CLK[1] through CLK[M] is shown in FIG. 4D.

Referring again to FIGS. 4A and 4B when any of C_SEL[1] through C_SEL[M−1] are high, the associated CLK1 signals, CLK1[1] through CLK1[M], are applied to the associated switches T1 through TM, which under these conditions, couples first ends of selected capacitors CI1 through CIM to ground, via VSS. Second ends of selected dump capacitors are set to a reset voltage, V_RESET, via switch SW1, thereby initializing the dump capacitors. Thereafter, CLK2 transitions high, and the first ends of selected dump capacitors CI1 through CIM are pulled up, via switches S1 through SM, to the increment voltage, V_GAIN. The increment of voltage that is transferred to the inverting input of amplifier 401, via switches SW2 and SW3, which is above the voltage value of V_RESET, is then integrated by integrator 400 by a negative ratio of the total dump capacitance of feedback capacitor, C2.

In accordance with the present invention, analog-to-digital data conversion is carried out using a multiple ramp voltage technique. In an exemplary embodiment, digital double sampling (DDS) is utilized to remove fixed pattern noise caused by process variations, device mismatch and kt/C reset noise. DDS requires two conversion stages the first for a reference conversion and the second for data conversion.

Figure 5:
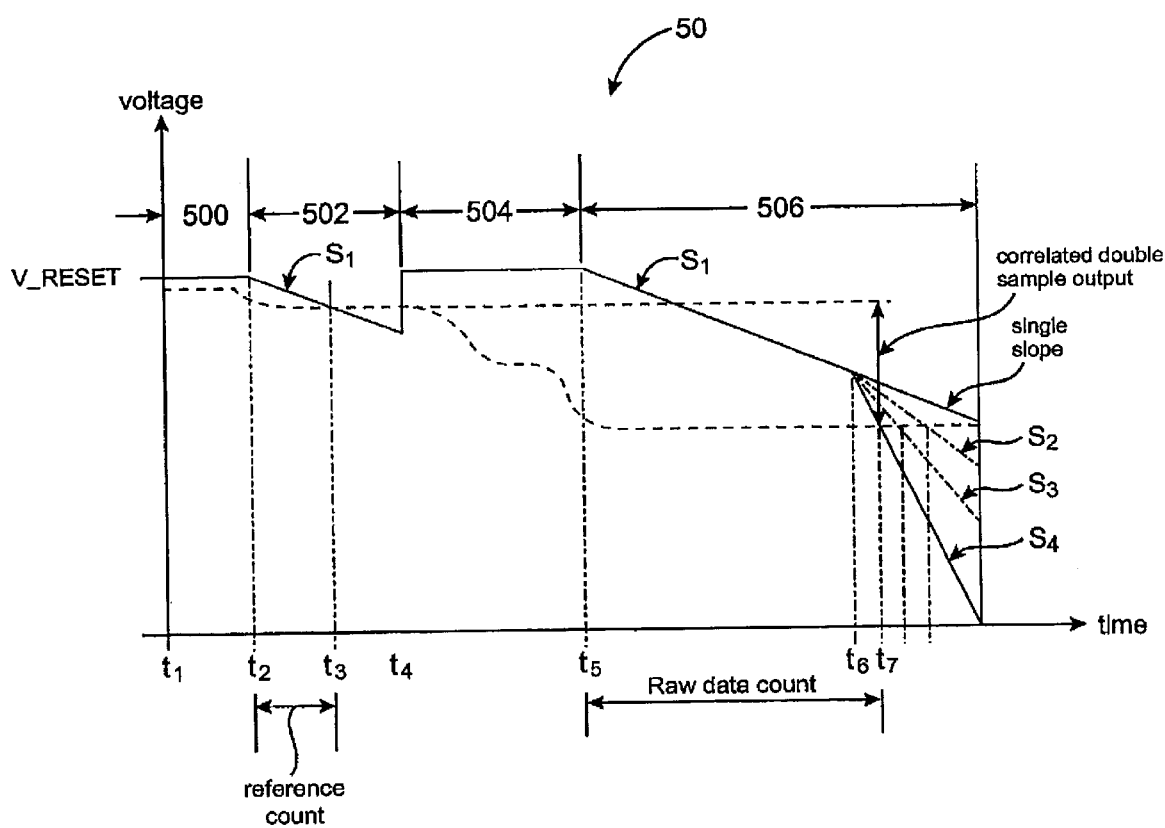
FIG. 5 shows an exemplary conversion cycle for a multiple slope ADC utilizing digital double sampling (DDS) according to the present invention.

FIG. 5 shows a conversion cycle 50, for an exemplary double slope ADC utilizing DDS, according to the present invention. The solid line represents the ramp voltage provided by a programmable ramp generator, like 40 in FIG. 4A, and the dashed line represents a sample analog pixel value. Conversion cycle 50 is comprised of reference conversion stage 502 and data conversion stage 504. The shallow slope S1 is programmed, as described before, for low light conditions so that increased resolution is provided to overcome pixel noise and the steeper slope (S2, S3, S4 etc.) are programmed for high light conditions where enhanced resolution is not required but increased dynamic range is desired.

Initially, between times t1 and t2, a preset operation is initiated and performed by preset circuit 402 of programmable ramp generator circuit 40 in FIG. 4A. 30 As shown in FIG. 4A, preset circuit is comprised of inverter 403 and transmission switch SW4. At time t1, PRESET signal is switched high and inverter 403 and switch SW4 operate to short output 404 of ramp generator 40 to the inverting input of amplifier 401. This produces a unity gain condition, whereby the potential at the inverting input of amplifier 401 is forced to assume the same potential as at the non-inverting input, i.e., the V_RESET voltage.

At time t2, the PRESET signal is switched low and reference conversion stage 502 commences. During this stage, ramp generator 40 starts integrating, producing a ramp voltage having a slope S1 at output 404 of ramp generator 40. After time t3, the ramp voltage becomes less than the analog pixel value and the digital count from counter 302 is stored in storage 312 as a digital reference of the analog pixel value. (See FIGS. 3 and 5).

At time t4, the preset operation is invoked once again to preset the ramp voltage at output 404 of ramp generator 40 to V_RESET. At time t5, data conversion stage 504 commences. Between times t5 and t6, the value of the ramped voltage signal decreases at the same rate S1 as during reference conversion stage 502. At time t6, the slope of the ramp voltage at output 404 of ramp generator 40 changes to a steeper slope S2, S3, S4 etc. by, for example, switching in one or more dump capacitors CI1 through CIM. The slope transition point at time t6 is preset and dictated by the number of counts of master clock 300. The slope transition point can be lengthened to enhance resolution for low analog pixel values or shortened to increase dynamic range. The time duration between t5 and t6, however, should be equal to or greater than the duration between time times t2 and t4. After time t7, the ramp voltage becomes less than the analog pixel value and the digital count from counter 302 is stored in storage 312 as a raw data count of the analog pixel value. The change in output voltage is directly proportional to the photocharge collected and is computed by digitally subtracting the raw data count from the reference data count. DDS used in the context of CMOS imaging is further described in *An Improved Digital CMOS Imager*, presented at the 1999 IEEE Workshop on Charge-Coupled Devices and Advanced Image Sensors, Jun. 10–12, 1999, which is incorporated herein by reference.

In conclusion, the present invention provides a novel multi-slope ADC for use in a CMOS imaging system. While the above is a complete description of the preferred embodiment of the present invention, it is possible to use various alternatives, modifications and equivalents. For example, the conversion cycle shown in FIG. 5, depicting a double slope ADC with DDS, is only exemplary. And, it is within the concept of the invention that a multiplicity of slopes can be generated, the number and steepness of the slopes programmed to fulfill the needs of a particular application. Therefore, the scope of the present invention should be determined not with reference to the above description, but should, instead, be determined with reference to the appended claims, along with their full scope of equivalents.

What is claimed is:

1. An ADC for converting an analog pixel voltage to a digital representation thereof, comprising:

1. a programmable ramp voltage generator configured to produce a ramp voltage signal, wherein the programmable ramp generator generates the ramp voltage signal in response to voltages on first and second capacitors;

a digital counter coupled to an input of the ramp voltage generator, configured to provide the digital representation;

a comparator having a first input coupled to an output of the ramp voltage generator and a second input coupled to the analog pixel voltage; and a switch configured to selectively couple the digital representation to a digital store upon a change in a voltage at the output of the comparator, wherein the slope of the ramp voltage can be programmable varied during a single conversion cycle by shorting one of the first and second capacitors.

2. The ADC of claim 1, wherein the change in voltage at the output of the comparator occurs when a voltage produced by the ramp voltage generator falls below the analog pixel voltage.

3. The ADC of claim 1, wherein the change in voltage at the output of the comparator occurs when a voltage produced by the ramp voltage generator rises above the analog pixel voltage.

4. The ADC of claim 1 wherein a slope of the ramp voltage signal varies depending on the magnitude of a gain voltage provided to an input of the ramp voltage generator.

5. The ADC of claim 1 wherein a slope of the ramp voltage signal varies depending on the frequency of one or more clock signals provided to one or more inputs of the ramp voltage generator.

6. The ADC of claim 1 wherein a conversion cycle for converting the analog pixel voltage to the digital representation incorporates digital double sampling.

7. An ADC for converting an analog pixel voltage to a digital representation thereof comprising:

a programmable ramp voltage generator configured to produce a ramp voltage signal, wherein the ramp generator further comprises:

an integrator configured to integrate a series of input charge increments to produce the ramp voltage signal, and a preset circuit configured to selectively couple an output of the integrator to a first input of the integrator so that the output of the integrator assumes a voltage applied to a second input of the integrator;

a digital counter coupled to an input of the ramp voltage generator, configured to provide the digital representation;

a comparator having a first input coupled to an output of the ramp voltage generator and a second input coupled to the analog pixel voltage; and a switch configured to selectively couple the digital representation to a digital store upon a change in a voltage at the output of the comparator, wherein the slope of the ramp voltage can be programmable varied during a single conversion cycle.

8. An ADC for converting an analog pixel voltage to a digital representation thereof, comprising:

a programmable ramp voltage generator configured to produce a ramp voltage signal, wherein a slope of the ramp voltage signal varies depending on the magnitude of a gain voltage provided to an input of the ramp voltage generator, and wherein the ramp generator fisher comprises a variable dump capacitor having a first end selectively coupled to the gain voltage and a second end selectively coupled to an integrator, a digital counter coupled to an input of the ramp voltage generator, configured to provide the digital representation;

a comparator having a first input coupled to an output of the ramp voltage generator and a second input coupled to the analog pixel voltage; and a switch configured to selectively couple the digital representation to a digital store upon a change in a voltage at the output of the comparator, wherein the slope of the ramp voltage can be programmably varied during a single conversion cycle.

9. The ADC of claim 8 wherein the ramp generator further comprises a plurality of variable dump capacitors selectively coupled in parallel with the fixed dump capacitor.

10. The ADC of claim 8 wherein the slope of the ramp voltage signal varies depending on the capacitance of the variable dump capacitor.

11. A CMOS imaging system, comprising:

a pixel array;

a row decoder coupled to the pixel array and configured to select a row of pixels within the pixel array;

a programmable multi-slope ADC coupled to the pixel array, the ADC configured to generate a digital representation of an analog pixel value for each pixel within the selected row of pixels during a conversion cycle; and wherein the ADC includes a programmable ramp generator for providing a variable slope ramp voltage, which is compared to the analog pixel values during the conversion cycle, and wherein the variable slope ramp voltage changes from a first slope to a second slope in response to a change in a capacitance.

12. The CMOS imaging system of claim 11, further comprising:

a timing generator and control circuit, coupled to the row decoder and ADC.

13. The CMOS imaging system of claim 12 wherein the ADC further comprises:

a parallel bank of comparators coupled to columns of the pixel array and operable to compare the analog pixel values of each pixel within the selected row to the ramp voltage.

14. The CMOS imaging system of claim 13, further comprising a line buffer coupled to the comparator bank and configured to store the digital representations of the analog pixel values.

15. A programmable ADC for a CMOS imaging system having an array of pixels, the ADC configured to provide, in one conversion cycle, a first conversion resolution for pixels providing a first analog voltage level and a second conversion resolution for pixels providing a second analog voltage level.

16. The programmable ADC of claim 15 wherein the first conversion resolution is higher than the second conversion resolution.

17. The programmable ADC of claim 16 wherein the ADC includes a ramp voltage generator that generates a ramp signal with first and second slopes, the ADC providing the first conversion resolution when the ramp signal has the first slope and the second conversion resolution when the ramp signal has the second slope.

18. The programmable ADC of claim 17 wherein a conversion cycle for converting each of the analog voltage levels incorporates digital double sampling.

19. A method of converting an analog pixel value, provided by a pixel in a CMOS imaging system, to a digital signal, the method comprising the steps of:
- comparing a first ramp voltage having a first slope to an analog pixel value;
- digitally counting during the time the first ramp voltage and analog pixel value are being compared;
- storing a reference count representative of the analog pixel value when, during the step of comparing, the first ramp voltage becomes less than or equal to the analog pixel value;
- comparing a second ramp voltage having a variable slope to the analog pixel value;
- digitally counting during the time the second ramp voltage and analog pixel value are being compared;
- storing a data count representative of the analog pixel value when, during the step of comparing, the second ramp voltage becomes less than or equal to the analog pixel value; and
- digitally subtracting the reference count from the data count to produce the digital signal,
- wherein all steps are performed with a single conversion cycle.

20. The method of claim 19 wherein the variable slope of the second ramp voltage has at least two slopes, a first slope providing a first conversion resolution for pixels providing a first analog pixel value and a second conversion resolution for pixels providing a second analog voltage level.

21. The method of claim 19 wherein the first conversion resolution is higher than the first conversion resolution.

22. The method of claim 21 wherein the first analog voltage level is lower than the second analog voltage level.

23. A method of converting an analog pixel value of a CMOS unit pixel in a CMOS imaging system to a digital signal in a single conversion cycle, the method comprising:
- performing a first preset of a programmable voltage ramp generator to an initial value;
- performing a reference conversion stage, during which a first ramp voltage having a first slope is compared to the analog pixel value;
- storing a reference count when the first ramp voltage equals the analog pixel value;
- performing a second preset of the programmable voltage ramp generator;
- performing a data conversion stage, during which a second ramp voltage having two slopes is compared to the analog pixel value;
- storing a data count when the second ramp voltage equals the analog pixel value; and
- digitally subtracting the reference count from the data count to produce the digital signal.

* * * * *